United States Patent
Bonola (10) Patent No.: US 7,076,629 B2
(45) Date of Patent: Jul. 11, 2006

(54) METHOD FOR PROVIDING CONCURRENT NON-BLOCKING HEAP MEMORY MANAGEMENT FOR FIXED SIZED BLOCKS

(76) Inventor: Thomas J. Bonola, 2318 Timberbreeze Ct., Magnolia, TX (US) 77355

( * ) Notice: Subject to any disclaimer, the term of this patent is extended or adjusted under 35 U.S.C. 154(b) by 337 days.

(21) Appl. No.: 10/037,806

(22) Filed: Dec. 26, 2001

(65) Prior Publication Data

US 2003/0120885 A1    Jun. 26, 2003

(51) Int. Cl.
*G06F 12/00* (2006.01)
(52) U.S. Cl. .................. 711/170; 711/100; 711/150; 711/168
(58) Field of Classification Search ............. 711/170; 709/104

See application file for complete search history.

(56) References Cited

U.S. PATENT DOCUMENTS

| | | | |
|---|---|---|---|
| 6,076,151 A * | 6/2000 | Meier | 711/171 |
| 6,412,053 B1 * | 6/2002 | Bonola | 711/170 |
| 6,504,768 B1 * | 1/2003 | Roohparvar et al. | 365/200 |
| 2001/0056420 A1 * | 12/2001 | Steele et al. | 707/8 |
| 2002/0144073 A1 * | 10/2002 | Trainin et al. | 711/170 |

OTHER PUBLICATIONS

*Non-Blocking Algorithms and Preemption-Safe Locking on Multiprogrammed Shared Memory Multiprocessors*, Maged M. Michael, Michael L. Scott, Mar. 1997 (35 pg.).

* cited by examiner

*Primary Examiner*—Mano Padmanaghan
*Assistant Examiner*—Midys Rojas (57) ABSTRACT

The specification discloses a heap memory management system in which software streams remove and replace blocks of heap memory from the heap pile, managed in a linked list fashion, in a last-in/first-out fashion at the top of the list. A hardware device returns blocks of heap memory, and this return is to the end or bottom of the linked list. In this way, software streams may remove and return blocks of heap memory simultaneously with hardware devices returning blocks of heap memory.

33 Claims, 6 Drawing Sheets

METHOD FOR PROVIDING CONCURRENT NON-BLOCKING HEAP MEMORY MANAGEMENT FOR FIXED SIZED BLOCKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to run time management of heap memory. More particularly, the preferred embodiments of the present invention are directed to a concurrent non-blocking heap memory management method that allows software to remove and return blocks of memory from the heap simultaneously with a hardware agent returning blocks to the heap.

2. Background of the Invention

In the art of computer programming, a programmer may not know at the time of coding the amount of memory required to perform a particular operation. Rather than statically allocate memory large enough to encompass any situation that may arise, programmers may dynamically allocate memory at run time necessary to perform the desired operation, thus improving the utilization of computer resources.

Memory allocated for use at run time is typically referred to as heap memory. Heap memory is allocated for use by a particular process, which may include multiple threads. This use typically comprises the one or more software threads claiming or removing blocks of the heap memory, using the blocks of heap memory, and then returning the blocks to the unused heap pile for removal and use by other software threads.

An exemplary use of a removed block of heap memory is a buffer for the exchange of command lists and/or data from software threads to hardware devices. That is, a software thread may need to program or pass large amounts of data to a hardware device, and the size of the program or data block may be too large to pass by way of a direct communication message. In such an situation, the related art software threads claim or remove a portion of heap memory (which may include one of more blocks), place the command lists and/or data into the memory locations, and inform the hardware device of the location in main memory of the command lists and/or data locations. Once the hardware completes the necessary tasks or reads the data, the heap memory block or blocks remain removed from the unused heap pile.

In related art computer systems, the method by which blocks of heap memory are returned after a hardware device completes its tasks is by a software thread, either the invoking thread or another software thread, returning the block to the heap pile. More particularly, in related art computer systems, the hardware device invokes an interrupt to the microprocessor, which preempts executing software streams and loads and executes an interrupt service routine. The interrupt service routine identifies the reason for the interrupt, which is the notification that the hardware task has completed and the heap memory block or blocks are no longer needed, and either returns the heap memory block, or invokes other software streams to return the memory block. Thus, a software stream returns the block to the heap memory for further claiming or removal.

Returning heap memory using interrupts could be inefficient. This inefficiency is seen not only in the use of an interrupt from the hardware device to the microprocessor to pass the message that the heap memory block may be returned, but also in preempting other software streams to service the interrupt and return the block.

Thus, what is needed in the art is a way to return blocks of heap memory that does not require assistance of the central processing unit or software streams.

BRIEF SUMMARY OF THE INVENTION

The problems noted above are solved in large part by a run time heap memory management method and related system that allows a hardware device, or an agent for hardware, to return heap memory blocks to the unused heap pile without intervention from the calling software stream, an interrupt service routine, or the like. The preferred implementation is a heap memory management method that works as a modified stack structure. Software preferably removes heap memory blocks and replaces heap memory blocks to the heap pile in a last-in/first-out (LIFO) fashion. A hardware device preferably returns heap memory blocks to the heap pile at the end or bottom of the stack without intervention of the software that removed the block of heap memory.

More particularly, the heap memory management method of the preferred embodiments comprises managing the blocks of the heap memory in a linked list format, with each memory block in the heap pile identifying the next unused block. Thus, removal of a heap memory block by a software stream preferably involves changing the value of a top pointer register, freeing the heap memory block previously listed in the top pointer register for use. Likewise, returning a block of heap memory to the heap pile by software streams preferably involves changing the address of the top pointer, and writing a portion of the heap memory block to be returned to link or point to the next block of memory in the list. While software streams remove and replace blocks of heap memory to the top of the list in a LIFO fashion, preferably hardware returns heap memory blocks to the bottom or end of the list by writing a null in the next block field of the block to be returned, changing the next block field of the last entry to point to the block to be returned, and updating a bottom pointer register to point to the block to be returned.

In the preferred implementation, however, one block of heap memory, with its next block field indicating a null, remains in the list and cannot be removed even if all the remaining heap memory blocks are removed. A hardware device, or an agent for multiple hardware devices, thus always has the capability of placing blocks of heap memory back in the heap pile.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

In this specification, and in the claims, the term "heap memory" refers generally to memory that is allocated to a software stream or streams for use during run time. The term "heap pile" refers to blocks of heap memory that have not been removed for use from the linked list of available blocks. Thus, to return a block of heap memory to the heap pile is to return the block of heap memory to the linked list such that it may be removed again at a later time.

DETAILED DESCRIPTION OF THE PREFERRED EMBODIMENTS

Figures 1, 2A:
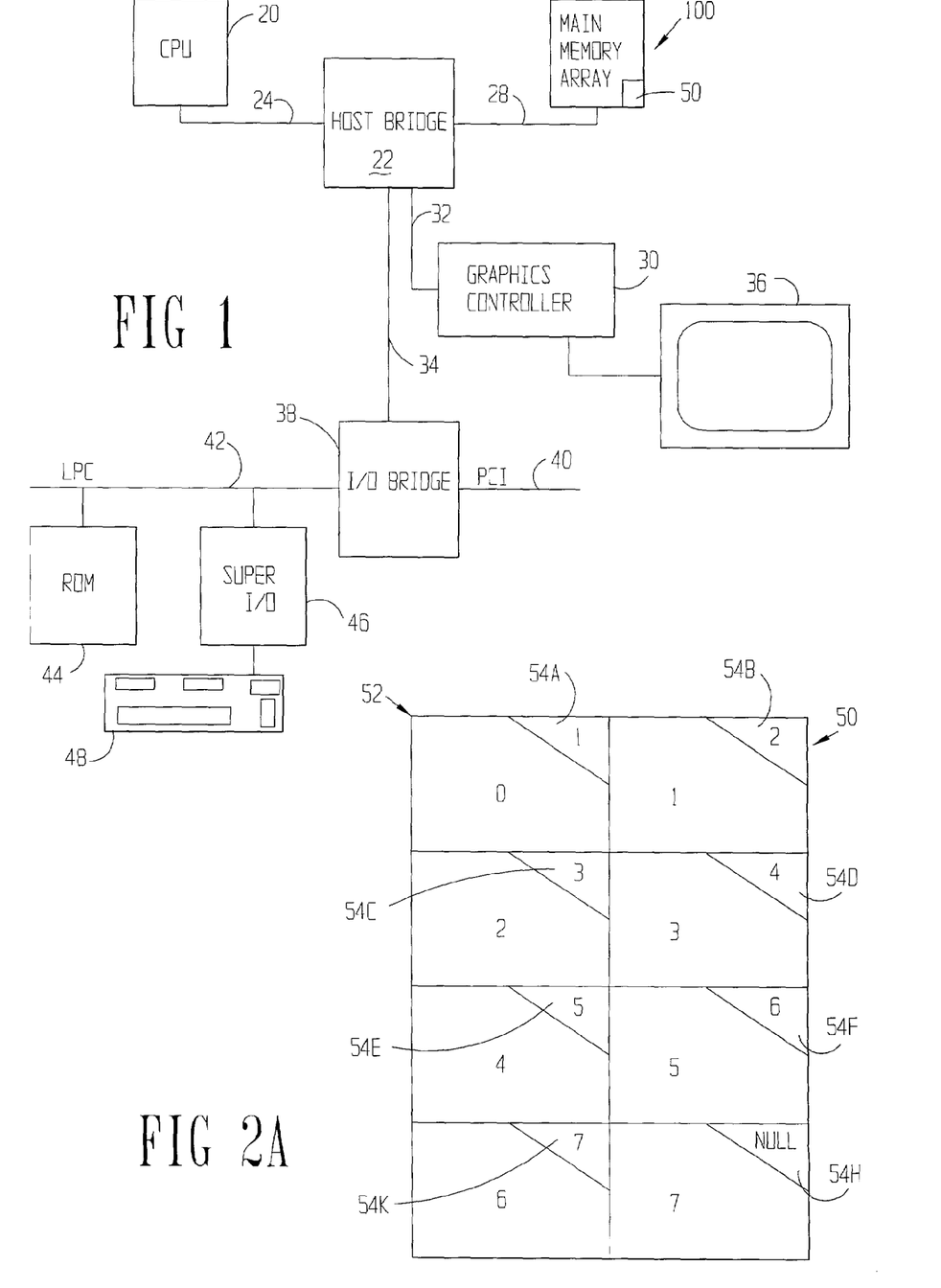
FIG. 1 shows a computer system constructed in accordance with the preferred embodiment.
FIG. 2A shows an exemplary heap of memory comprising a plurality of fixed size blocks.

FIG. 1 shows a computer system 100 constructed in accordance with the preferred embodiment. Computer system 100 generally comprises a microprocessor or CPU 20 coupled to a main memory array 26, and various other peripheral computer system components, through an integrated host bridge 22. The CPU 20 preferably couples to the host bridge 22 via a host bus 24, or the host bridge logic 22 may be integrated into the CPU 20. The CPU 20 may comprise any microprocessor commercially available, for example, a Pentium® III or a Pentium® IV made by Intel Corporation. Though only one microprocessor is shown in FIG. 1, the preferred embodiments find application in multiple microprocessor systems, which may likewise contain several host bridge devices, each coupled to a plurality of microprocessors.

Main memory array 26 preferably couples to the host bridge 22 through a memory bus 28. The host bridge 22 preferably includes a memory control unit (not shown) that controls transactions to the main memory 26 by asserting necessary control signals during memory accesses. The main memory 26 functions as the working memory for the CPU 20, and any additional microprocessors coupled to the host bridge 22. Generally, the main memory array 26 comprises a conventional memory device or array of memory devices in which programs, instructions and data are stored. The main memory array 26 may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The computer system 100 also preferably comprises a graphics controller or video driver card 30 that couples to the host bridge 22 by way of bus 32, which bus could be an Advanced Graphics Port (AGP), or other suitable bus. Alternatively, the graphics controller may couple to the primary expansion bus 34 or one of the secondary expansion buses, for example, peripheral component interconnect (PCI) bus 40. Graphics controller 30 further couples to a display device 36, which may comprise any suitable electronic display device upon which any image or text can be represented.

The computer system 100 also preferably comprises a second bridge logic device, input/output (I/O) bridge 38, that bridges the primary expansion bus 34 to various secondary buses including a low pin count (LPC) bus 42 and the PCI bus 40. The bridge device 36 may be any suitable bridge device on the market. Although the I/O bridge 38 is shown in FIG. 1 only to support the LPC bus 38 and PCI bus 40, various other secondary buses may be supported by the I/O bridge 38.

The primary expansion bus 34 may comprise any suitable expansion bus. If the I/O bridge 38 is an ICH 82801AA made by Intel Corporation, then the primary expansion bus may comprise a Hub-link bus, which is a proprietary bus of Intel Corporation. However, computer system 100 is not limited to any particular type of primary expansion bus, and thus other suitable buses may be used, for example, a PCI bus.

FIG. 1 also shows a read only memory (ROM) device 44 coupled to the I/O bridge 38 by way of the LPC bus 42. The ROM 46 preferably contains software programs executable by the CPU 20 which may comprise programs to implement basic input/output system (BIOS) commands, and also instructions executed during and just after power on self test (POST) procedures. The LPC bus 42 also couples a super I/O controller 46 to the I/O bridge 38. The super I/O controller 46 controls many computer system functions including interfacing with various input and output devices such as keyboard 48. The super I/O controller 48 may further interface, for example, with a system pointing device such as mouse (not shown), various serial ports (not shown) and floppy drives (not shown). The super I/O controller 48 is often referred to as "super" because of the many I/O functions it may perform.

FIG. 1 further shows a portion of the main memory array 26 is preferably designated as heap memory 50. FIG. 2A shows the heap memory 50 in block diagram form. Preferably, main memory allocated for heap memory purposes is a set of continuously addressed memory locations, and the heap memory is divided into fixed size blocks—each block preferably having the same number of bytes, and the number of bytes being a $2^N$ multiple (1, 2, 4, 8, 16, 32, 64, etc.). In this way, the address of a block within the heap memory 50 is a shift operation based on the base address 52, preferably the first memory location, the number of blocks and the size of each block.

Figure 2B:
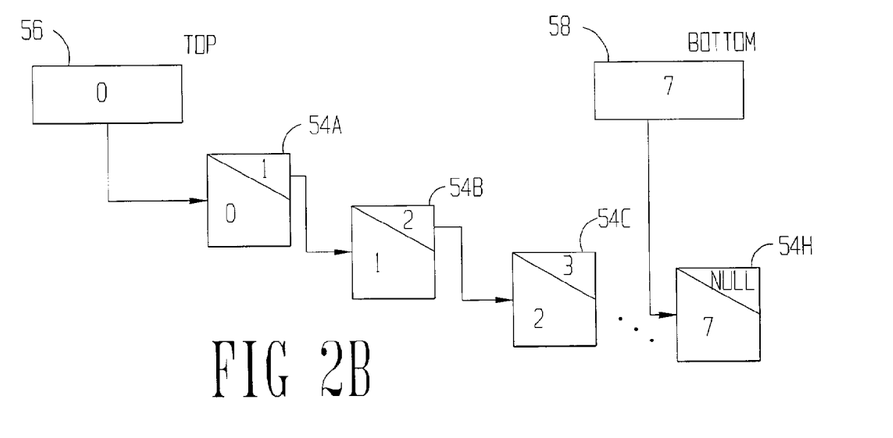
FIG. 2B shows the exemplary heap memory of FIG. 2A in a more graphical form.

The exemplary heap memory in FIG. 2A comprises eight fixed sized blocks (labeled 0 through 7 in the figure). Each block, while stored unused in the heap pile, preferably has a next block field 54 that points to the next block in the linked list, preferably by block number. Thus, block 0 of FIG. 2A has a next block field 54A that points or links to block 1, block 1 has a next block field 54B that links to block 2, and so on through block 6 having a next block field 54G that links to block 7. Block 7, being the last block in the exemplary linked list, has a next block field 54H content of null. The importance of the last block is discussed more thoroughly below. FIG. 2B shows much the same information as FIG. 2A, but better exemplifies the preferred linked list orientation of the blocks. In particular, FIG. 2B shows that the next block field 54A of block 0 points to block 1. The next state field 54B of block 1 points to block 2, and so on. FIG. 2B also shows two registers, Top register 56 and Bottom register 58. Preferably, Top register 56 points to the first or top block of the heap memory in the linked list, in the exemplary case of FIG. 2B block 0. Likewise, Bottom register 58 preferably points to the bottom end or last block of heap memory in the linked list, in the exemplary case of FIG. 2B block 7. It must be understood however that the linked list shown in FIGS. 2A and 2B are merely exemplary. The number of blocks in the heap memory is subject to change at the whim of the software stream that creates the heap, and the particular order of the linked blocks changes as those blocks are removed and returned from the list.

Figure 3:
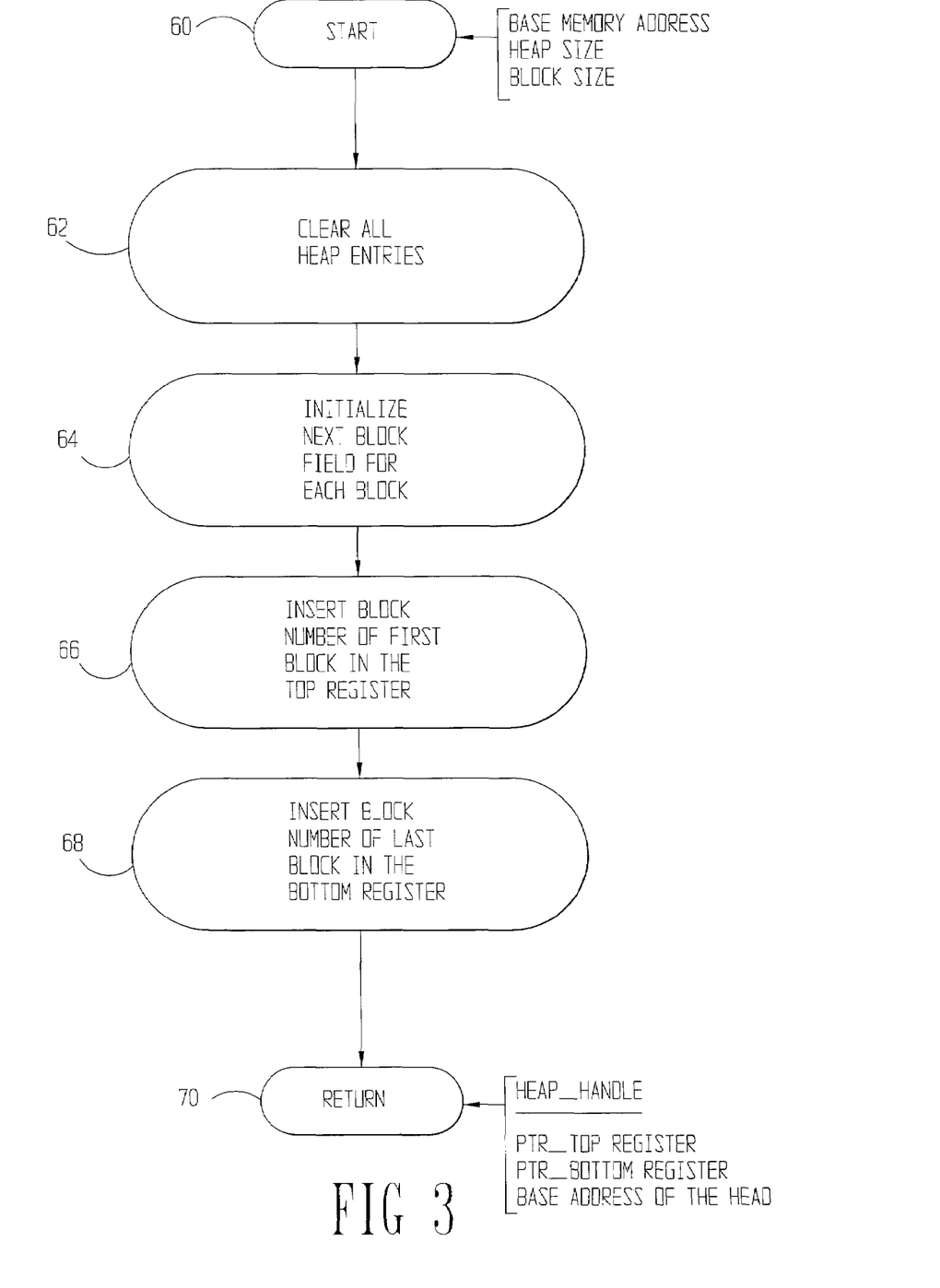
FIG. 3 shows a high level flow diagram of the steps to initialize the heap memory.

FIG. 3 shows a high level flow diagram of the steps to initialize the heap memory for use in the preferred embodiments, starting with step 60. In calling a software routine implementing the steps of FIG. 3, preferably three parameters are passed by the calling routine: the Base Memory Address of the heap, the Heap Size, and a preferred Block size. It must be understood that in the preferred embodiments of the present invention no particular heap size or block size is more preferred. These parameters are determined by the calling routine.

After the software routine is called and the appropriate parameters passed, preferably all the entries in the heap memory are cleared (set to zeros) (step 62). Thereafter, the next block field 54 of each block is initialized to form the linked list (step 64), which may initially appear similar to the linked lists shown in FIGS. 2A and 2B. After initializing of the next block fields, the number of the first block in the linked list is inserted into the Top register 56 (step 66), and the number of the last block in the list is inserted in the Bottom register 58 (step 68). Finally, the routine ends (step 70) by returning a Heap_Handle to the calling software, which Heap_Handle comprises pointers to the Top and Bottom registers, as well as the base addresses of the heap memory.

Figure 4A:
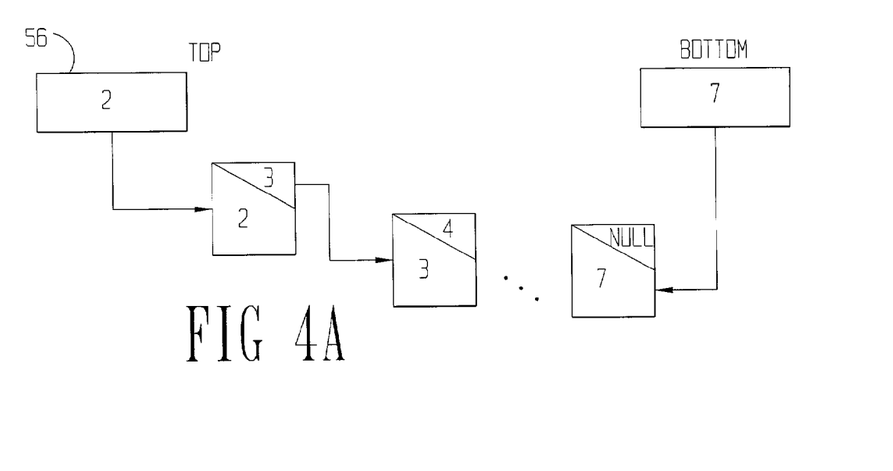
FIG. 4A shows the exemplary linked list of FIG. 2B with the two uppermost blocks removed.

After the heap has been allocated and initialized into the linked list structure of the preferred embodiments, software streams are free to remove blocks from the list for use. In broad terms, removal of the blocks from the heap memory by software streams is preferably a last-in/first-out (LIFO) scheme, also known as a stack. Blocks of heap memory are preferably removed from the top or beginning of the list, and they are preferably returned by software streams to the top of the list. FIG. 4A shows the exemplary linked list of FIG. 2B with the two upper most blocks (blocks 0 and 1) removed from the list. What remains in FIG. 4A, of the exemplary eight blocks shown in FIG. 2B, are blocks 2 through 7.

Figure 5:
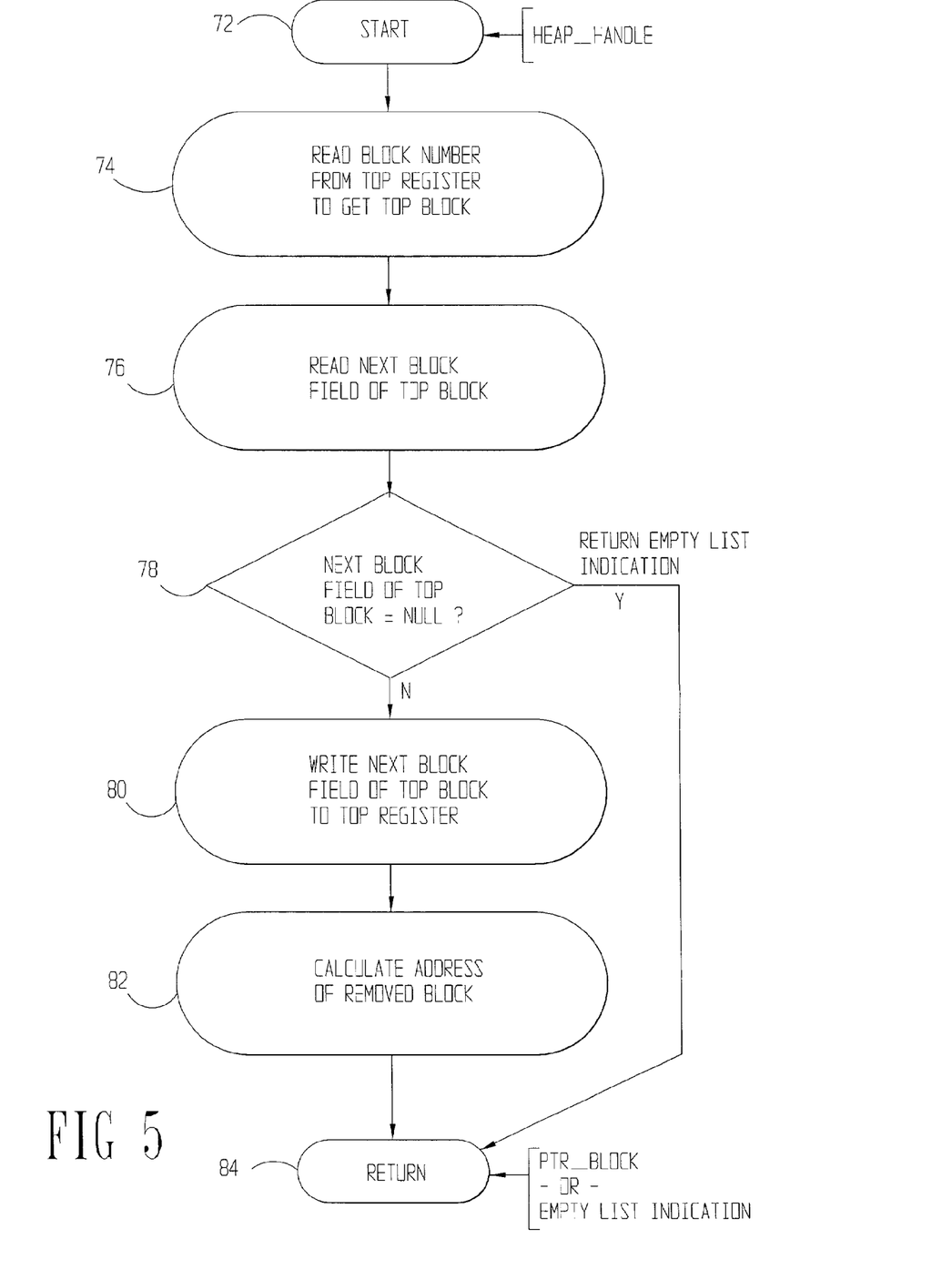
FIG. 5 shows a high level flow diagram of the steps used by software streams to remove blocks of heap memory.

FIG. 5 shows a high level flow diagram of the steps preferably used by software streams to remove blocks of heap memory from the heap pile. In particular, the routine preferably starts at step 72, and is passed the Heap_Handle parameter. The first step preferably involves reading the number held in the Top Register 56, to determine the next or top block on the linked list that can be removed (step 74). Next, the top block's next block field 54 is read (step 76), and if the next block field of the top block is null, then the list is considered empty and the routine ends returning an empty list indicator (steps 78 and 84). The importance of indicating an empty list when a single block remains is discussed with respect to a hardware device or an agent for multiple hardware devices returning blocks of heap memory to the heap pile. If the next block field of the top block of the linked list contains a block number, and not a null character, the block number in the next block field of the top block is preferably atomically written to the Top register 56 (step 80). By writing the Top register 56, the block pointed to by the Top register becomes the next available block at the top of the heap memory. One of ordinary skill in the art understands that step 80 of FIG. 5 inherently contains additional steps required in a shared variable environment. In particular, writes to shared memory locations require atomic operations such as atomic compare-and-swap primitives which also implement retries when the compare step fails. For a more detailed discussion of concurrent non-blocking algorithms, refer to "Non-Blocking Algorithms and Preemption-Safe Locking on Multiprogrammed Shared Memory Multiprocessors," authored by Maged M. Michael and Michael L. Scott, Journal of Parallel and Distributed Computing, 1998, pages 1–26, which paper is incorporated by reference as if reproduced in full below. Finally, the address of the block removed is calculated (step 82), and the process returns a pointer to the removed block (step 84).

Because access to the heap memory is preferably non-blocking, a software stream attempting to remove the block preferably does not block access by other software streams to parameters such as the Top register. For this reason, it is possible that the value of the Top register may change between the step of reading the block number of the first block on the list (step 74), and writing a new block number to the Top register (step 80). In such a circumstance, the process of removal preferably starts anew at step 72. One having ordinary skill in the art understands the limitations of concurrent non-blocking algorithms, and now understanding the steps involved in the removal process could account for the contingencies in a software program implementing the steps of FIG. 5.

Because in the preferred embodiments the blocks are of fixed $2^N$ size, calculating the base address of the removed block is a shift operation of the base memory address of the heap. Consider an exemplary case where the block size is eight bytes, implying a difference in starting addresses between contiguous blocks of three bits. In this exemplary case, determining the address of any removed block involves shifting the block number by three bits, and adding the shifted result to the base address. Preferably, the base memory address has the lowest address value, with the heap memory addresses growing larger toward the end of the heap. Thus, if block 0 is removed, calculating the address of the first memory location of block 0 simply involves shifting 0 (which is still zero) and adding the shifted result to the base memory address. This is consistent with block 0 being the first block in the heap memory. If, however, the removed block of heap memory is block 2 (10 binary), calculating the starting address involves shifting the block number three bits and adding the shifted result to the base memory address. Thus, the shift operation is left shift; however, it is equally valid to have the base address of the heap memory as the largest address, and in this case shifts to determine addresses of the block need to be a right shift (or division operation). The process exemplified in FIG. 5 is for removal of a single block. If multiple blocks are required, the process is preferably repeated multiple times.

Figure 4B:
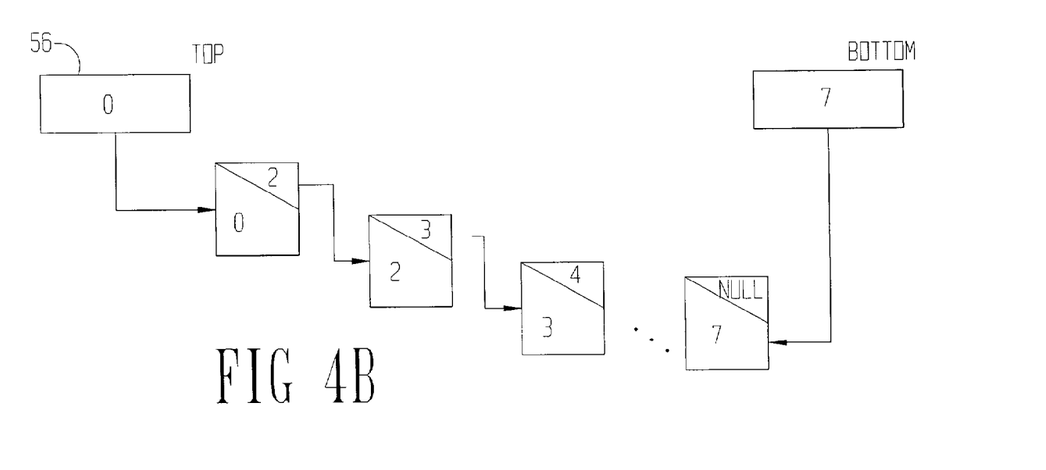
FIG. 4B shows the exemplary linked list of FIG. 4A with heap memory block zero returned to the top of the list.

Consider now the adding or return of a block of heap memory to the unused heap pile by a software stream where, prior to the return, the linked list is as exemplified in FIG. 4A. FIG. 4B shows that, in broad terms, when software returns blocks of heap memory, in this exemplary case block 0, the returned blocks are preferably placed at the beginning of the linked list, consistent with preferred stack operation heap memory management.

Figure 6:
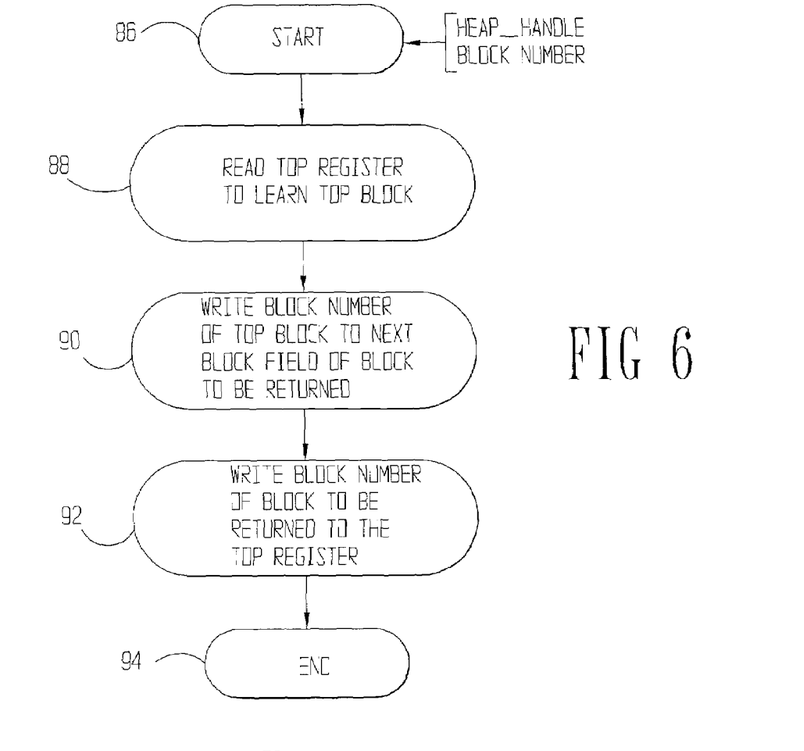
FIG. 6 shows a high level flow diagram of the steps used to return blocks of heap memory by software streams.

FIG. 6 shows a high level flow diagram detailing the return of blocks to the unused heap pile by software streams. Preferably after starting (step 86) and passing of the Heap-Handle and block number parameters, the first step is a read of the Top register 56 to determine the top block in the linked list (step 88). Once the top block has been determined, preferably the top block number is written to the next block field of the block to be returned (step 90). Once the link is made by having the next state field of the block to be returned reflecting the top block, the returned block is effectively added to the list by atomically writing the returned block number to the Top register 56 (step 92) and the process ends (step 94). Again, one of ordinary skill in the art understands that the steps exemplified by step 90 require atomic compare-and-swap primitives, or the like, which implement the concurrent non-blocking aspect of the preferred embodiments.

Summarizing before continuing, software streams remove memory blocks from the heap by taking the first block in the linked list and atomically updating the Top register 56. Likewise, software streams return blocks of heap memory by updating the next block field of the block to be returned to point to the first block of the free list, then atomically writing the Top register 56 to point to the returned block. Thus, as for software removal and return of a block of heap memory, the linked list works in a LIFO fashion. In the preferred embodiments however, a hardware device, or an agent for multiple hardware devices, has the ability to return blocks of heap memory to the heap pile.

Figure 7A:
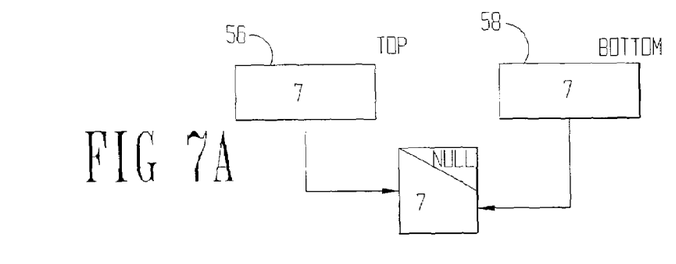
FIG. 7A shows the exemplary linked list with all but the last block removed.
Figure 7B:
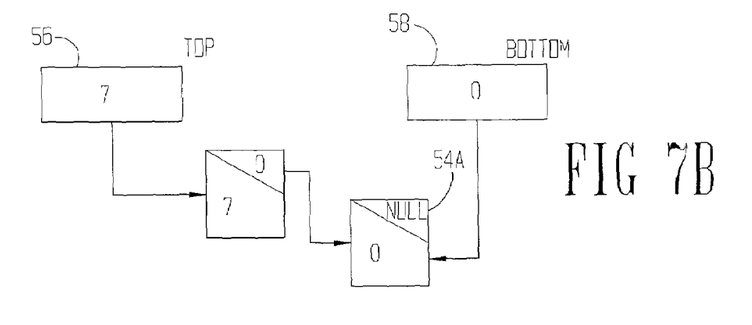
FIG. 7B shows the return by hardware of a block of heap memory to the exemplary linked list of FIG. 7A.

FIG. 7A shows the linked list of the exemplary heap memory with all but the seventh block removed. In the preferred embodiments, one block remains in the linked list when the list is considered empty. Thus, if a calling routine attempts to remove a block from heap memory with only one block remaining, the calling routine is preferably returned an indication that no blocks are available (steps 78 and 84 of FIG. 5). By requiring at least one block of heap memory in the linked list at all times, a hardware agent may return blocks without causing contention with software streams. More particularly, a hardware device, or an agent for multiple hardware devices, preferably returns blocks to the linked list at the bottom or end of the list. Thus, while software operates on a LIFO basis at the top of the stack, hardware returns blocks to the bottom. Consider an exemplary return of block 0 by a hardware agent to the linked list shown in FIG. 7A. FIG. 7B shows the status of the linked list after the return of the block 0 by a hardware agent.

Figure 8:
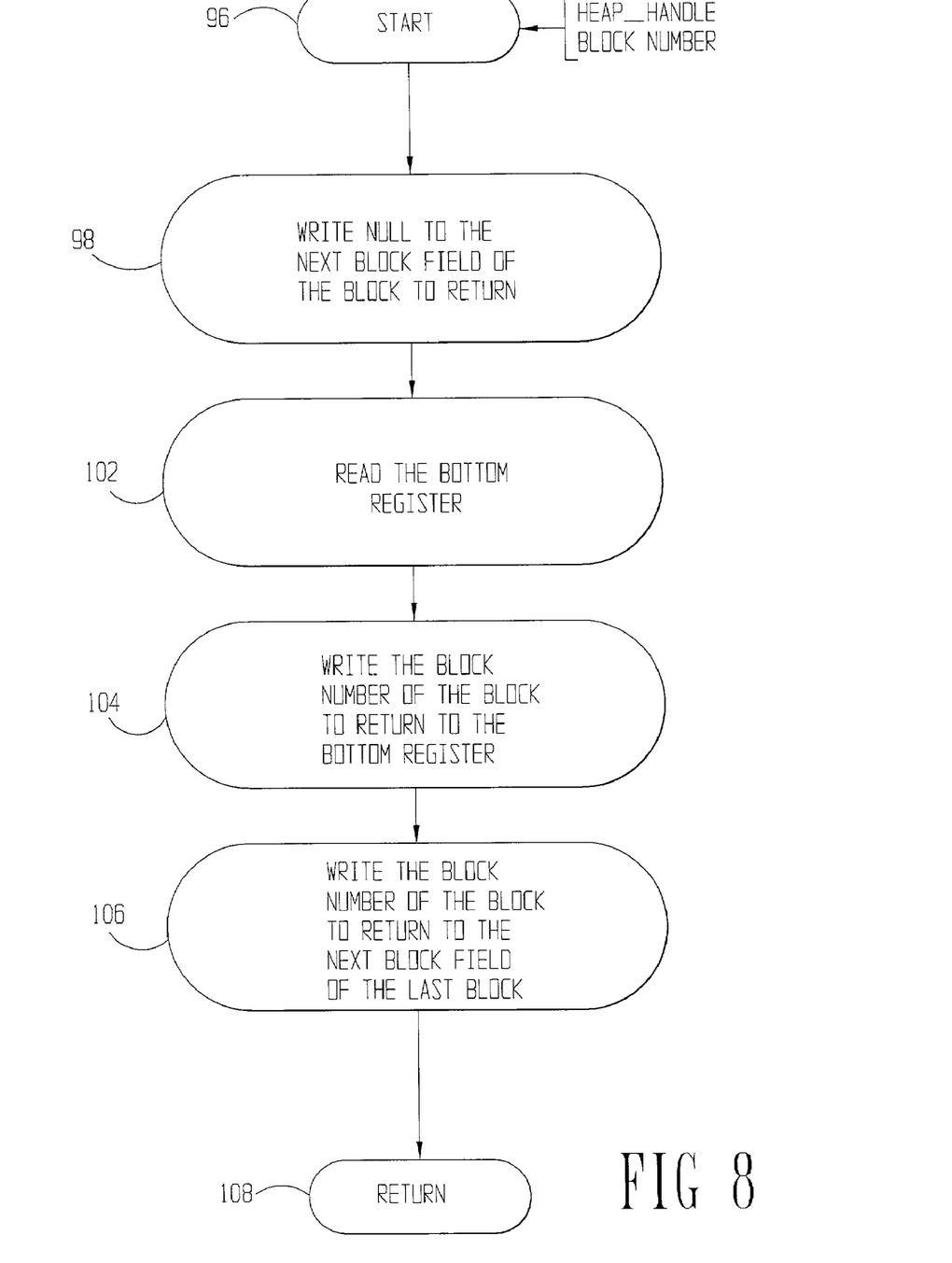
FIG. 8 shows a high level flow diagram of the return of blocks of heap memory by hardware devices.

FIG. 8 shows a high level flow diagram of the steps to return a block of heap memory to the unused heap pile by hardware devices, starting with the passing of the Heap-Handle and block number parameters at step 96. The first step is to write a null to the next state field of the block to return to the heap pile (step 98). Next, the Bottom register 58 is read (step 102), thus identifying the block of heap memory occupying bottom or end position of the linked list. The Bottom register 58 is updated with the number of the block to return (step 104), and the current last block's next block field is updated to contain the block number of the block to return (step 106). Thus, the process of returning a block of heap memory to the heap pile is complete, and the process returns (step 108).

In the preferred embodiment, only a single agent is allowed to return blocks of heap memory in the fashion described. The single agent could be a hardware device, or could be an agent acting on behalf of multiple hardware devices. A non-limiting list of hardware devices that could implement the heap memory management method comprises graphics cards, network interface cards, audio devices, and mass storage devices such as hard drives and compact disc drives.

By allowing software threads or streams to operate on a first end of the linked list, and hardware devices to operate on a second end of the linked list, the return and removal process may take place simultaneously. In having at least one block of heap memory in the linked list when the list is considered empty, software streams and hardware devices need not access the same registers, thereby avoiding contention. That is, software streams need only access the Top register 56 for both removal and return of blocks, and hardware need only access the Bottom register 58.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    performing heap memory operations on a first end of a linked list of free heap memory of a heap pile by a software stream executed on a processor, the performing by the software stream using an atomic operation; and concurrently
    returning a return block of heap memory to the heap pile at a second end of the linked list of free heap memory by a hardware device coupled to the processor, the returning by the hardware device using a non-atomic operation.

2. The method as defined in claim 1 wherein returning a return block of heap memory further comprises:
    writing a null to a next block field of the return block of heap memory;
    writing a block number of the return block of heap memory to a next block field of a last block of heap memory in the linked list;
    changing the contents of a bottom register to point to the return block of heap memory; and hereby
    making the return block of heap memory a last entry in the linked list.

3. The method as defined in claim 1 wherein performing heap memory operations further comprises returning, by the software stream, a second block of heap memory by placing the second block of heap memory at the first end of the linked list.

4. The method as defined in claim 3 wherein returning the second block of heap memory at the first end of the linked list by the software stream further comprises:
    determining a block number of a primary block of heap memory resident at the first end of the linked list;

writing the block number of the primary block of heap memory to a next block field of the second block; and writing atomically a block number of the second block to a top register.

5. The method as defined in claim 4 wherein determining a block number of a primary block of heap memory resident at the first end of the linked list further comprises reading the top register prior to writing the block number of the second block.

6. The method as defined in claim 1 wherein performing heap memory operations further comprises removing, by the software stream, heap memory from the first end of the linked list.

7. The method as defined in claim 6 wherein removing heap memory from the linked list heap management system further comprises taking a primary block of heap memory resident at the first end of the of the linked list.

8. The method as defined in claim 7 wherein taking a primary block of heap memory further comprises:
determining a block number of the primary block;
reading a next block field of the primary block of memory; and
removing the primary block if the next block field of the primary block does not indicate a null.

9. The method as defined in claim 8 wherein determining a block number of the primary block further comprises reading a top register, wherein the top register identifies the beginning of the linked list.

10. The method as defined in claim 8 wherein removing the primary block if the next block field of the primary block does not indicate a null further comprises writing a block number of the next block field of the primary block to the top register.

11. The method comprising as defined in claim 1 wherein performing further comprises performing by a software stream executed on a processor different than the hardware device.

12. A method of managing a heap memory comprising:
maintaining unused blocks of heap memory as a linked list, and wherein the unused blocks of the linked list comprise a first block at a beginning of the linked list, a second block pointed to the first block, and a third block at an end of the linked list;
removing, by a software stream executed on a processor and using an atomic operation, the first block from the linked list, thus making the second block the beginning of the linked list; and
returning a return block, by a hardware device coupled to the processor that used the return block, to the linked list by placing the return block at the end of the linked list with a non-atomic operation.

13. The method of managing a heap memory as defined in claim 12 wherein returning a return block further comprises:
writing a null to a next block field of the return block;
reading a bottom register, he bottom register identifying the third block;
writing a block number of the return block to a next state field of the third block; and
writing the block number of the return block to the bottom register.

14. The method of managing a heap memory as defined in claim 12 wherein removing, by a software stream, the first block from the linked list further comprises:
reading a top register, the top register identifying the first block;
reading a next block field of the first block, the next block field of the first block identifying the second block; and writing a block number of the second block to the top register.

15. The method of managing a heap memory as defined in claim 14 wherein writing a block number of the second block to the top register further comprises atomically writing the block number of the second block to the top register.

16. The method of managing a heap memory as defined in claim 12 further comprising returning, by a software stream, a fourth block to the linked list by placing the fourth block at the beginning of the linked list, thus making the fourth block the beginning of the linked list.

17. The method of managing a heap of memory as defined in claim 16 wherein returning a fourth block to the linked list by placing the fourth block at the beginning of the linked list further comprises:
reading a top register, the top register identifying the beginning of the linked list;
writing a block number of the block identified by the top register to a next state field of the fourth block; and
writing a block number of the fourth block to the top register.

18. The method of managing a heap memory as defined in claim 17 wherein writing a block number of the fourth block to the top register further comprises atomically writing the block number of the fourth block to the top register.

19. A method of managing a heap memory in a computer system, the method comprising:
allowing a software thread executed on a processor to add and remove blocks of heap memory from a linked list of free blocks of heap memory in a last-in/first-out (LIFO) fashion at a first end of the linked list and using an atomic operation; and
allowing a hardware device that uses blocks of heap memory to add the blocks of heap memory to the linked list of free blocks of heap memory at a second end of the linked list using a non-atomic operation, the hardware device coupled to the processor by way of a communication bus.

20. The method of managing a heap memory in a computer system as defined in claim 19 wherein allowing a software thread to remove blocks of heap memory in LIFO fashion further comprises:
determining, by the software thread, a block number of a block of heap memory at the first end of the linked list; and
removing the block of heap memory at the first end of the linked list.

21. The method of managing a heap memory in a computer system as defined in claim 20 determining a block number of a block of heap memory at the first end of the linked list further comprises reading a beginning register that stores a block number of a block of heap memory at the first end of the linked list.

22. The method of managing a heap memory in a computer system as defined in claim 21 wherein removing the block of heap memory at the first end of the linked list further comprises:
reading a next block field of the block of heap memory at the first end of the linked list to identify a block number of a next block in the linked list; and
writing the block number of the next block in the linked list to the beginning register.

23. The method of managing a heap memory in a computer system as defined in claim 20 wherein allowing a software thread to add blocks of heap memory in LIFO fashion further comprises:

determining, by the software thread, a block number of a block of heap memory at the first end of the linked list;

writing the block number of the block of heap memory at the first end of the linked list to a next block field of a return block of heap memory; and making the return block of heap memory the first end of the linked list.

24. The method of managing a heap memory in a computer system as defined in claim 23 wherein determining a block number of a block of heap memory at first end of the linked list further comprises reading a beginning register that stores a block number of a block of heap memory at the first end of the linked list.

25. The method of managing a heap memory in a computer system as defined in claim 24 wherein making the return block of heap memory the first end of the linked list further comprises writing a block number the return block of heap memory to the beginning register.

26. The method of managing a heap memory in a computer system as defined in claim 20 wherein allowing a hardware device that uses blocks of heap memory to add the blocks of heap memory to the linked list of free blocks of heap memory at a second end of the linked list further comprises:

determining, by the hardware device, a block number of a block of heap memory at the second end of the linked list;

writing, by the hardware device, a block number of a return block of heap memory to a next block field of the block of heap memory at the second end of the linked list; and making the return block of heap memory the second end of the linked List.

27. The method of managing a heap memory in a computer system as defined in claim 26 wherein determining a block number of a block of heap memory at the second end of the linked list further comprises reading an end register that stores a block number of the block of heap memory at the second end of the linked list.

28. The method of managing a heap memory in a computer system as defined in claim 27 wherein making the return block of heap memory the second end of the linked list further comprises writing a block number the return block of heap memory to the end register.

29. A computer system comprising:
a microprocessor executing a software stream;
a main memory array, a portion of the main memory array allocated to be a heap memory, and wherein unused portions of the heap memory are part of a heap pile, the heap pile further comprising
a plurality of blocks;
each block having a next block field; and
wherein the heap pile is maintained as a linked list, each block's next block field pointing to a next block in the list;
a first bridge logic device coupling the microprocessor to the main memory array;
a hardware device coupled to the heap memory through the first bridge logic device;
wherein the software stream executed on the microprocessor removes blocks of heap memory from a beginning of the heap pile using an atomic operation; and simultaneously
the hardware device returns blocks of heap memory used by the hardware device to an end of the heap pile using a non-atomic operation.

30. The computer system as defined in claim 29 wherein the plurality of blocks each have the same number of bytes.

31. The computer system as defined in claim 29 further comprising the software stream returns blocks to the heap pile at the beginning of the heap pile simultaneously as the hardware device returns blocks of heap memory used by the hardware device to the end of the heap pile.

32. The computer system as defined in claim 29 wherein the hardware device is one or more selected from the group: a graphics card; a network interface card; an audio card; a mass storage device; a hard drive; or a compact disk storage device.

33. A method comprising:
performing, by a software stream executed on a processor, heap memory operations on a first end of a linked list of free heap memory of a heap pile, the performing using an atomic operation; and concurrently
returning a return block of heap memory to the heap pile at a second end of the linked list of free heap memory, the returning by a hardware device coupled to the processor using a non-atomic operations and selected from group consisting of a graphics card, a network interface card, an audio device or a mass storage device.

* * * * *

UNITED STATES PATENT AND TRADEMARK OFFICE
CERTIFICATE OF CORRECTION

PATENT NO. : 7,076,629 B2 Page 1 of 1
APPLICATION NO. : 10/037806
DATED : July 11, 2006
INVENTOR(S) : Thomas J. Bonola It is certified that error appears in the above-identified patent and that said Letters Patent is hereby corrected as shown below:

In column 8, line 55, in Claim 2, delete "hereby" and insert -- thereby --, therefor.

In column 9, line 55, in Claim 13, delete "he" and insert -- the --, therefor.

In column 11, line 36, in Claim 26, delete "List" and insert -- list --, therefor.

Signed and Sealed this

Third Day of March, 2009

JOHN DOLL
*Acting Director of the United States Patent and Trademark Office*